United States Patent [19]

Uchida et al.

[11] Patent Number: 4,854,783
[45] Date of Patent: Aug. 8, 1989

[54] VERTICAL HYDRO-HOIST WITH ADJUSTABLE FLOATS AND METHOD OF OPERATING THE SAME

[75] Inventors: Kenji Uchida, Kashiwa; Nobuyuki Banba, Ibaraki; Minoru Kuroiwa, Abiko; Makoto Saito, Ibaraki; Yukishige Kamino, Tsuchiura, all of Japan

[73] Assignee: Hitachi, Ltd., Tokyo, Japan

[21] Appl. No.: 169,476

[22] Filed: Mar. 17, 1988

[30] Foreign Application Priority Data

Mar. 20, 1987 [JP] Japan .................................. 62-63817

[51] Int. Cl.⁴ ............................................ B65G 51/34
[52] U.S. Cl. ........................................ 406/13; 141/83;
417/93; 417/102; 417/103; 73/322.5; 406/14;
406/15; 406/23; 406/36; 406/12
[58] Field of Search ....................... 406/10, 12, 13–15,
406/23, 30, 36, 109; 73/322.5, 448–449;
417/126, 130, 138, 92, 101–103; 141/83, 94;
222/62, 67

[56] References Cited

U.S. PATENT DOCUMENTS

| 1,492,349 | 4/1924 | Brown et al. ....................... 73/322.5 |
| 2,003,869 | 6/1935 | Stegemann ........................ 141/94 X |
| 3,556,682 | 1/1971 | Sakamoto et al. ............. 73/322.5 X |
| 4,031,581 | 6/1977 | Baugh ................................... 441/29 |
| 4,037,992 | 7/1977 | Uchida et al. ................... 406/109 X |
| 4,193,057 | 3/1980 | Bennett et al. .................... 441/29 X |
| 4,231,686 | 11/1980 | Sakamoto et al. ..................... 406/14 |
| 4,239,423 | 12/1980 | Sakamoto et al. ............... 406/109 X |
| 4,310,491 | 1/1982 | Sakamoto et al. ................ 417/92 X |
| 4,321,016 | 3/1982 | Sakamoto et al. .............. 417/103 X |
| 4,347,223 | 8/1982 | Kitaoka et al. .................... 417/92 X |
| 4,362,193 | 12/1982 | Erdos et al. ............................. 141/94 |
| 4,387,595 | 6/1983 | Sakamoto et al. ................ 222/62 X |
| 4,460,318 | 7/1984 | Horton .............................. 417/103 X |
| 4,494,583 | 1/1985 | Reeves, Jr. et al. ............. 141/94 X |
| 4,536,131 | 8/1985 | Saito et al. ....................... 417/103 X |
| 4,547,132 | 10/1985 | Uchida et al. .................. 417/103 X |
| 4,605,356 | 8/1986 | Uchida et al. ........................ 417/102 |

FOREIGN PATENT DOCUMENTS

| 0005457 | 1/1980 | Japan .................................... 417/138 |
| 0597929 | 3/1978 | U.S.S.R. ................................. 73/448 |

Primary Examiner—Joseph F. Peters, Jr.
Assistant Examiner—Gregory R. Poindexter
Attorney, Agent, or Firm—Antonelli, Terry & Wands

[57] ABSTRACT

A vertical hydro-hoist for conveying a slurry under pressure by using a liquid obtained from a chemical process as a driving liquid and method for operating the same, the hydro-hoist includes at least one feed chamber and a detector for detecting a relationship of specific gravities between a driving liquid, a slurry and a float desporent in the at least one feed chamber. A holding member is provided for holding the float and a device, provided for supplying or discharging a specific gravity adjusting liquid into and out of the float. After temporarily holding the float in the feed chamber, the adjusting liquid is supplied into or discharged out of the float in accordance with the relationship detected by the detector.

14 Claims, 3 Drawing Sheets

VERTICAL HYDRO-HOIST WITH ADJUSTABLE FLOATS AND METHOD OF OPERATING THE SAME

BACKGROUND OF THE INVENTION

The present invention relates to a hydro-hoist and method of operating the same for conveying a slurry under pressure by a driving liquid and, more particularly, to a vertical hydro-hoist and method for feeding a slurry under pressure by using a liquid obtained from a chemical process as a driving liquid in, for example, coal liquefaction.

In, for example, U.S. Pat. Nos. 4,387,595 and 4,536,131, as well as in Japanese Patent Application Laid Open KOKAI No. 56 145026 (1981) and Japanese Patent Publication No. 48 15163 (1973), it has been proposed to convey a slurry under pressure through a float by a driving liquid after temporarily charging a plurality of feed chambers with the slurry. In construction of the aforementioned type, an adjustment of the specific gravity of the float is effected by a bellows provided at a portion of the float so that an apparent specific gravity of the float is varied according to a magnitude of the pressures of the slurry and the driving liquid.

It has also been proposed to provide an arrangement wherein the specific gravity of the float is adjusted by regulating or controlling a weight provided at a lower portion of the float.

In chemical processes such as, for example, coal liquefaction, a liquefied oil is ordinarily used as a driving liquid, and it is apparent that the specific gravity of the driving liquid depends on the type of coal being processed.

In this connection, in the above described proposals, no consideration has been given to ensuring that the specific gravity of the float can be easily adjusted in accordance with a change in a specific gravity of the driving liquid or the specific gravity of the slurry. Consequently, an adjustment of the float has been carried out by momentarily or temporarily stopping the operation of the entire process of the hydro-hoist, taking out the float from the feed chamber, and regulating the weight provided for the float in accordance with the specific gravity of the driving liquid. Alternatively, several types of floats differing in specific gravity had been prepared to be substituted as required.

Thus, for adjusting a specific gravity of the float, it has been necessary to momentarily or temporarily stop the operation of the hydro-hoist, thereby adversely affecting the overall liquefacation process and, consequently, increasing the operating cost thereof.

The aim underlying the present invention essentially resides in providing a vertical hydro-hoist and method of operating the same wherein a specific gravity of a float can easily be adjusted in accordance with changes in a specific gravity of either a driving liquid or slurry without stopping the operation of the hydro-hoist and, more particularly, without stopping the operation of the overall process.

In accordance with advantageous features of the present invention, a vertical hydro-hoist is proposed which comprises a plurality of feed chambers for momentarily or temporarily reserving a slurry, and supplying discharge pipes for a driving liquid for feeding the slurry under pressure, with the supply and discharge pipes being connected to an upper portion of each of the feed chambers, and with the slurry feed and discharge pipes being connected to a lower portion of each of the feed chambers. Sensors or detectors are provided at upper and lower portions or parts on an outside of the feed chamber for detecting or sensing a position of a float floating at an interface between the slurry and the driving liquid in each of the feed chambers. Valves are provided in the driving liquid supply and discharge pipes and the slurry feed and discharge pipes, with the valves being open and closed in accordance with data received from the detectors to thereby feed the slurry under pressure. A specific gravity detector or sensor is also provided for detecting or sensing the specific gravity of at least one of either the driving liquid or the slurry. Moreover, a device for adjusting the specific gravity of the float is provided and the specific gravity adjusting device includes a holder member for momentarily or temporarily gripping the float. Means are provided for supplying and discharging a specific gravity adjusting liquid into and out of the float, with a controller being provided for the specific gravity adjusting device for adjusting the specific gravity of the float in accordance with a deviation or variation between a preset specific gravity of the float and a specific gravity detected by the specific gravity detector or sensor.

In accordance with further advantageous features of the present invention, a vertical hydro-hoist is proposed which includes feed chambers, supply and discharge pipe means for a driving liquid, slurry feed and discharge pipe means, a float means, a float position detector means, a detector means for detecting a rise and fall of the float means over a predetermined distance, and a means for adjusting the specific gravity of the float means and a controller means. The specific gravity adjusting means includes a holder member for momentarily or temporarily gripping the float means and means for supplying and discharging a specific a specific gravity adjusting liquid into and out of the float means. The controller means controls the specific gravity adjusting means for adjusting the specific gravity of the float means in accordance with the difference between the rise time and the fall time detected or sensed by the detector means.

In accordance with still further features of the present invention, a method for operating a hydro-hoist is proposed, with the hydro-hoist including a plurality of feed chambers for reserving or storing a slurry, supply and discharge pipes means for feeding a driving liquid to the feed chambers, slurry and feed discharge pipe means for feeding slurry to the feed chamber, and a float means provided in the feed chambers, with the method including the steps of detecting a relationship of the specific gravity between the driving liquid, the slurry and the float means, and stopping the operation of at least one of the feed chambers, fixing the float means at a predetermined position in the feed chamber for stopping the operation, adjusting the specific gravity of the float means by supplying or discharging a specific gravity adjusting liquid into or out of the float means in accordance with a detected relationship of the specific gravities, and establishing the following relationship:

$$SG_L \leqq SG_F \leqq SG_S,$$

where:

$SG_L$ = the specific gravity of the driving liquid;
$SG_F$ = the specific gravity of the float means; and
$SG_S$ = the specific gravity of the slurry means.

According to still further features of the present invention, the specific gravity of at least one of either the driving liquid or the slurry is detected by detector means and, when the detected specific gravity shows a deviation or variation from a preset or predetermined allowable specific gravity, the operation of at least one feed chamber is stopped and the specific gravity of the float means is adjusted The rise time and fall time of the float means are detected and, when a difference between the rise time and the fall time exceeds a preset or predetermined allowable value, the operation of least one feed chamber is stopped and the specific gravity of the float is adjusted. Accordingly, the specific gravity of the float means can be adjusted without stopping the operation of the hydro-hoist, that is, without exerting any influence on the overhaul processing operation.

The above and other objects, features, and advantages of the present invention will become more apparent from the following description when taken in connection with the accompanying drawings which show, for the purpose of illustration only, one embodiment in accordance with the present invention.

DETAILED DESCRIPTION

Figure 1:
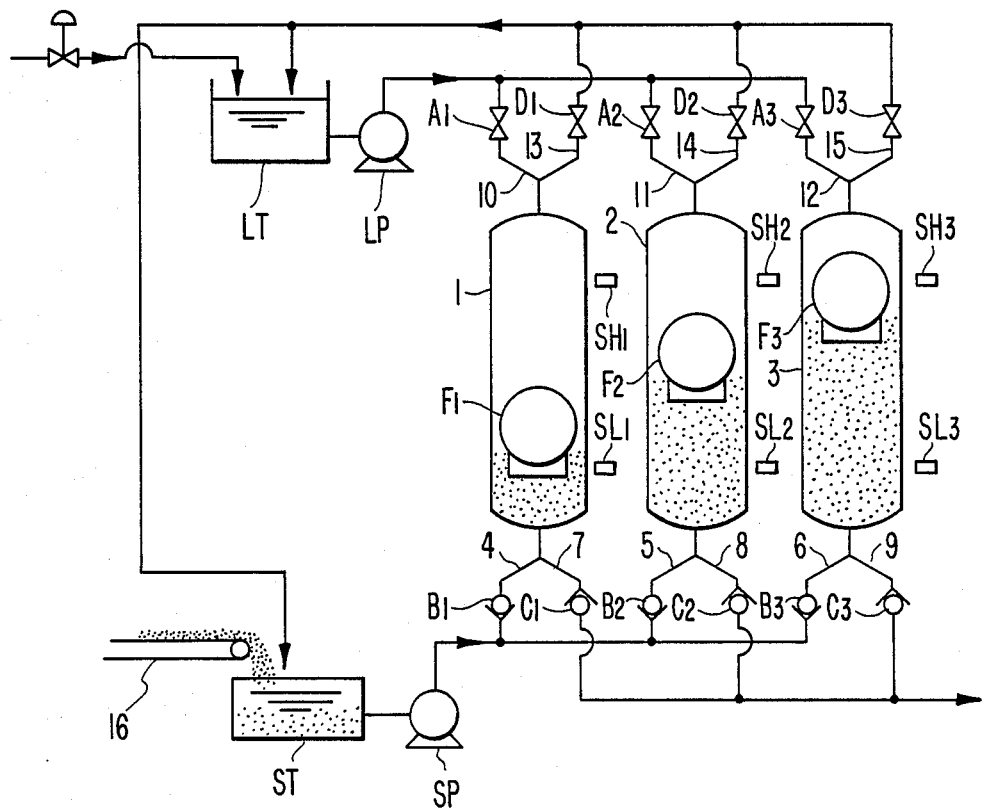
FIG. 1 is a schematic longitudinal view of a vertical hydro-hoist constructed in accordance with the present invention.
Figure 2:
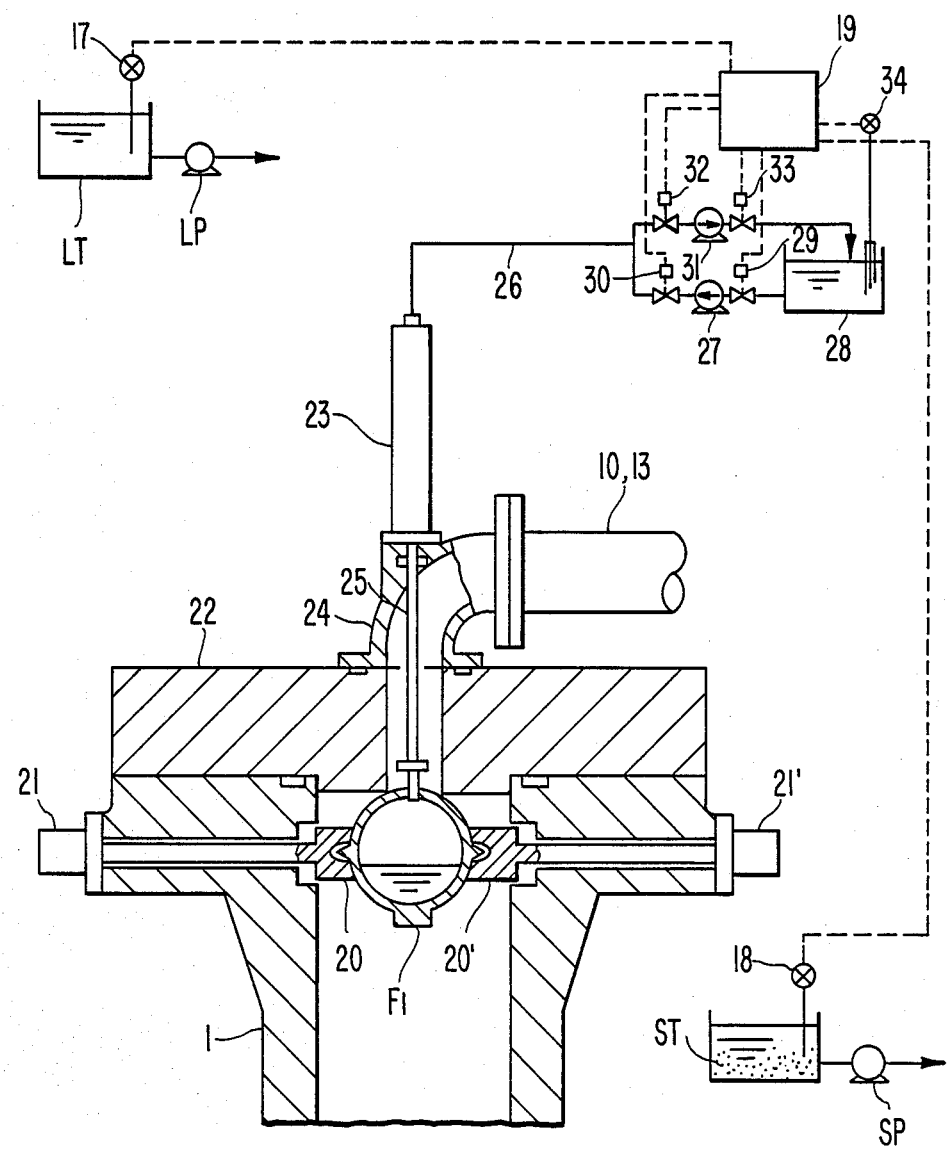
FIG. 2 is a partially schematic detailed view of the vertical hydro-hoist of the present invention.

Referring now to the drawings wherein like reference numerals are used throughout the various views to designate like parts and, more particularly, to FIGS. 1 and 2, according to these figures, a vertical hydro-hoist includes a plurality of feed chambers, 1, 2, 3, for momentarily or temporarily reserving or accommodating a slurry, with the feed chambers 1, 2, 3 being connected to high-pressure driving liquid supply pipes 10, 11, 12 through which a driving liquid, lower in specific gravity than the slurry in a slurry tank ST, is fed into the feed chambers 1, 2, 3 through selector or control valves $A_1$, $A_2$, $A_3$ by a high-pressure driving liquid pump LP, and discharge pipes 13, 14, 15 through which the driving liquid is returned into the slurry tank ST through selector or control valves $D_1$, $D_2$, $D_3$.

Feed pipes 4, 5, 6 are respectively connected to lower portions of the feed chambers 1, 2, 3, with the feed pipes 4, 5, 6 feeding or supplying the slurry from the slurry tank ST into the feed chambers 1, 2, 3 through check valves $B_1$, $B_2$, $B_3$ by a slurry pump SP, and discharge pipes 7, 8, 9 through which the slurry is fed out or discharged to the exterior through check valves $C_1$, $C_2$, $C_3$. Floats $F_1$, $F_2$, $F_3$ are disposed in the interior of the feed chambers 1, 2, 3, with a buoyancy of the floats $F_1$, $F_2$, $F_3$ being selected so that each of the floats $F_1$, $F_2$, $F_3$, is always positioned at an interface between the slurry and the driving liquid. Detectors or sensors $SH_1$, $SH_2$, $SH_3$ and $SL_1$, $SL_2$, $SL_3$ are disposed outside of the feed chambers, with the detectors $SH_1$, $SH_2$, $SH_3$ and $SL_1$, $SL_2$, $SL_3$ being constructed as, for example, proximity switches, for detecting upper and lower limit positions of the floats $F_1$, $F_2$, $F_3$. A belt conveyor 16 supplies a solid material into the slurry tank ST.

Figure 3:
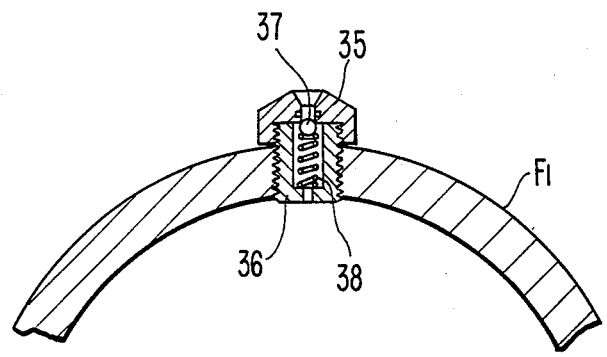
FIG. 3 is an enlarged cross-sectional view of a portion of a float in the vertical hydro-hoist of FIG. 2.

As shown in FIGS. 2 and 3, specific gravity detectors 17, 18 are provided at the driving liquid tank LT and the slurry tank ST, respectively. The specific gravity detector detects the specific gravity of the driving liquid, and the specific gravity detector 18 detects the specific gravity of the slurry. A controller 19 which comprises a conventional memory unit for storing the specific gravities of the float, the slurry, and the driving liquid at the start of operation and the like is provided along with an arithmetic unit of conventional construction, for calculating the quantities of a specific gravity adjusting liquid supplied into and discharged from the float. Float holder members 20, 20' are provided at a feed chamber flange 22 on the upper portion side of each feed chamber and constitute a specific gravity adjusting device. The float holder members 20, 21 momentarily or temporarily hold the float at a time of adjusting the specific gravity of the float, under expanding and contracting actions of the hydraulic cylinders 21 and 21'. Additionally, the flange 22 is provided with a hydraulic cylinder 23 provided with a feed/discharge pipe 25 for the float specific gravity adjusting liquid at a 90° bend 24. A feed/discharge pipe 26 is provided for the float specific gravity adjusting liquid, a liquid feed pump 27, a specific gravity adjusting liquid tank 28, a suction valve 29 of the liquid feed pump, a delivery valve 30 of the liquid feed pump, a vacuum pump 31 for discharging the liquid, a suction valve 32 of the vacuum pump, a delivery valve 33 of the vacuum pump, and a liquid level sensor means 34 for sensing or detecting the liquid level in the tank 28 are also provided.

As shown in FIG. 3, a liquid feed/discharge disk 35 is provided at a top portion of the float $F_1$, with the disk 35 being mounted in the float $F_1$ by a threaded holder 36, and the above-mentioned feed/discharge pipe 26 for the float specific gravity adjusting liquid is inserted into the float $F_1$ by way of a ball 37 and spring 38 so as to enable an adjustment of the specific gravity of the float $F_1$.

For the purposes of simplicity, the method of the present invention will be described in connection with only one feed chamber. More particularly, in accordance with the method of the present invention, first the slurry is fed under pressure to a feed chamber 1. With the feed chamber 1 filled with a driving liquid and both the check valve $C_1$ for the slurry and selector or control valve $A_1$ in the high-pressure driving liquid pipe 10 closed and the selector valve $D_1$ in the discharge pipe 13 opened, when the slurry pump SP is driven, the slurry is fed from the slurry tank ST into the feed chamber 1 by pushing open the selector or control valve $B_1$ in the slurry feed pipe 4, discharging the driving liquid out of the feed chamber 1 through the selector valve $D_1$. Therefore, the interface between the driving liquid and the slurry is raised and the float $F_1$ floating at the interface is also simultaneously raised a corresponding amount. When the interface reaches the upper portion of the feed chamber 1, the float $F_1$ which has been raised is detected by the upper limit proximity switch $SH_1$. Then the selector valve $D_1$ is closed upon receipt of the detection signal from the proximity switch $SH_1$.

Next, with the selector valve $A_1$ opened, presuming the high-pressure driving liquid pump LP has already been operating, the check valve $B_1$ is closed; whereas, the check valve $C_1$ is opened, and the driving liquid pushes down the slurry which is fed under pressure from a lower portion of the feed chamber 1 into a high-pressure transport pipe through the check valve $C_1$. Therefore, the interface between the driving liquid and the slurry is lowered and the float $F_1$, floating at the interface, is simultaneously lowered a corresponding amount. When the float $F_1$ reaches the lower portion of the feed chamber 1, it is detected by the lower limit proximity switch $SL_1$ and the detection signal causes the selector valve $A_1$ to be closed.

Next, with the selector valve $D_1$ opened, the interface is again raised and, when these operations are carried out according to such a time schedule, the operational cycles of the three feed chambers 1, 2, 3 are staggered so that slurry can be continuously fed under pressure. The continuous slurry feeding operation is effective where neither the specific gravity of the slurry nor the driving liquid varies.

In a situation where the specific gravity of the slurry or the driving liquid is varied, the following operating method may be carried out.

For the purpose of description, it is presumed that the driving liquid, slurry and floats have the following specific characteristics:

Range of specific gravity of driving liquid
= 1.02 to 1.12;
Range of specific gravity of slurry
= 1.05 to 1.20; and
Specific gravity of floats
= 2.05.

It has been determined that it is difficult to detect the float by detectors and operate the hydro-hoists based on detection systems in a vertical hydro-hoists if the specific gravity of the float does not fulfill the following relationship:

$$SG_L \leq SG_F \leq SG_S,$$

where:
$SG_L$ = the specific gravity of the driving liquid;
$SG_F$ = the specific gravity of the float; and
$SG_S$ = the specific gravity of the slurry.

By comparing the above characteristics with the above-noted relationship, it can been seen that the hydro-hoist operation cannot be carried out under the condition where the specific gravity of the driving liquid is greater than 1.05; however, when the specific gravity of the driving liquid is in the range of 1.02 to 1.05, it is possible to carry out the operation. The controller 19 presets the following operating ranges and supervises or controls the operation so that the following relationships are always met:

$$\text{Specific gravity of float} \leq \text{specific gravity of driving liquid} + 0.01 \quad (1)$$

$$\text{Specific gravity of float} \leq \text{specific gravity of slurry} - 0.01 \quad (2)$$

For example, when the specific gravity of the driving liquid is increased to 1.05, the value exceeds the preset allowable range in formula (1) and, accordingly, the operation of the feed chamber is stopped, and the operation of only the feed chambers 1 and 2 is continued. Then, for the float $F_3$ of the feed chamber 3, the operation of which is stopped, a specific gravity adjustment is carried out in the following manner.

First the selector valve $D_3$ for discharging the driving liquid is opened to raise the float $F_3$ to the feed chamber flange 22. The float $F_3$ is momentarily or temporarily held by the float holder members 20, 20' by the hydraulic cylinders 21 and 21'. The feed/discharge pipe 25 for the float specific gravity adjusting liquid is projected into the driving liquid feed/discharge bend 24 by he hydraulic cylinder 23 so as to be inserted into the liquid feed/discharge disk 35 at the top part of the float $F_3$ and then moved into the float $F_3$ by way of the ball 37. The liquid feed pump 27 is driven and the suction valve 29 and delivery valve 30 are opened. In a manner described hereinabove, the amount of liquid to be supplied into the float $F_3$ is calculated in accordance with the following relationships, and only that amount of liquid is supplied:

$$\gamma = W/V \quad (3)$$

where:
$\gamma$ = apparent specific gravity of float
$W$ = weight of float; and
$V$ = volume of float.

In the controller 19, the above data are stored, and a specific gravity $\gamma$ of the float stored in place is 1.05. Therefore, the specific gravity $\gamma'$ of the float to be newly set is determined by the following relationship:

$$\gamma' = \gamma + 0.01 \quad (4).$$

Accordingly, the amount v of the adjusting liquid to be supplied into the float $F_3$ is calculated by the following relationship:

$$V = 1/\rho(\gamma'V - W) \quad (5)$$

where:
v = amount of specific gravity adjusting liquid; and
$\rho$ = specific gravity of specific gravity adjusting liquid.

The amount v of the specific gravity adjusting liquid supplied into the float $F_3$ is detected by the liquid level sensor 34 in the tank 28, and the liquid feed pump 27 is stopped at the moment the specific gravity adjusting liquid is supplied by a predetermined amount.

The suction valve 29 and the delivery valve 30 are closed. The hydraulic cylinder 23 is moved in a reverse direction, namely, in a contracting direction, to contain the pipe 25 in the bend 24. The float holder members 20, 20' are moved respectively leftward and rightward by the hydraulic cylinders 21 and 21' thereby releasing the float $F_3$ from the momentary or temporary hold. By the above operations, the adjustment of the specific gravity of the float $F_3$ in the feed chamber 3 is completed. Then, after putting the feed chamber 3 into the operating cycle, the specific gravities of the floats $F_2$ and $F_1$ in the feed chambers 2 and 1 are sequentially adjusted by the same process as described above.

When the specific gravity of the driving liquid is lowered to, for example, 1.04, the current specific gravity of the float 1.06, is within the allowable set range and, accordingly, the operation is continued without any change. However, since the mother liquor of the slurry is generally constituted of the driving liquid, a lowering in the specific gravity of the driving liquid is followed by a gradual lowering in the specific gravity of the slurry as well thereby resulting in not meeting the requirements of relationship (2) noted above. For example, when the specific gravity of the slurry is lowered to 1.05 where the specific gravity of the float is 1.06, the float sinks thereby making it difficult to continue operation. In such a situation, the selector valve for discharging the driving liquid opened to raise the float to the feed chamber flange, the float is momentarily or temporarily held by the float holder members and the feed discharge pipe for the float specific gravity adjusting liquid is projected into the driving liquid feed/discharge bend by the hydraulic cylinder to be inserted into the liquid feed/discharge disk at the top part of the float and then moved into the float by way of the ball.

With a decrease in the specific gravity of the float $F_3$, the liquid discharge vacuum pump 31 is driven and the suction valve 32 and the delivery valve 33 are opened. At this time, the specific gravity $\gamma''$ of the float $F_3$ to be newly set is determined by the following relationship $$\gamma'' = \gamma - 0.01 \qquad (6)$$

Therefore, the amount v of the adjusting liquid to be discharged from the float $F_3$ is calculated by the following relationship:

$$v = 1/\rho(\gamma''V - W) \ldots \qquad (7)$$

The amount v of the liquid is detected by the liquid level sensor which stops the driving of the vacuum pump 31. The suction valve 32 and the delivery valve 31 are closed. The hydraulic cylinder 23 is moved in a direction reverse to the above, namely, in a contracting direction, to contain the pipe 25 into the bend, and the float holder member 20, 20' are respectively moved leftward and rightward by the hydraulic cylinders 21, 21' thereby releasing the float from the momentary hold.

On the other hand, when the specific gravity of the driving liquid or the slurry is varied, a time difference is generated between the rise time and fall time of the float. A method for adjusting the specific gravity or the float by sensing of detecting the change thereof through detection of the rise and fall times utilizing the above fact will now be explained.

Figure 4:
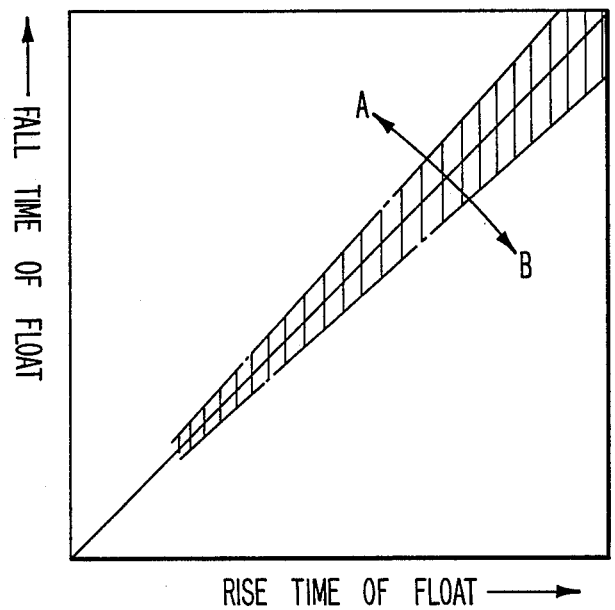
FIG. 4 is a graphical illustration of a relationship between a rise time and a fall time of a float in a hydro-hoist constructed in accordance with the present invention.

FIG. 4 provides a graphical illustration of the relationship between the rise time and fall time of the float, with the abscissa representing the rise time of the float and the ordinate representing the fall time of the float. In FIG. 4, the solid line represents an operating condition where no time difference exists between the rise time and fall time, hereinafter referred to as the reference set time T, in which case the specific gravity fulfill the relationship $SG_L \leq SG_F \leq SG_S$. The shaded area in FIG. 4 represents an allowable set range which is within $+10\%$ based on the rise time or fall time. The time relationship graphically illustrated in FIG. 4 is stored in the controller 19.

In FIG. 4, the arrow A illustrates the specific gravity of the float at near or equal to the specific gravity of the driving liquid; whereas, the arrow B illustrates the specific gravity of the float at near or equal to the specific gravity of the slurry and $SL_1$, $SL_2$, $SL_3$ for detecting the upper and lower limit of the respective floats are respectively connected with timers not shown. The reference set time T for the rise time and fall time of the respective floats $F_1$, $F_2$, $F_3$, namely, the period of time required for the movement of the respective floats $F_1$, $F_2$, $F_3$ from the lower limit to the upper limit or vice versa in the feed chamber is determined by the following relationship:

$$T = \frac{L \cdot \pi \cdot D^2}{4Q} \qquad (8)$$

where:
L = the distance between the upper and lower limit position detector;
D = the inside diameter of the feed chamber; and
Q = the rate of flow into or out of the feed chamber.

As evident from a review of the relationship (8) the reference set time T varies with the flow rate Q.

The rise and fall times of the floats are detected by the position detectors and the timers, and when the rise time and fall time are in and allowable set range, the operation is continued. When the above described time differential or difference is generated and the rise and fall times are out of the allowable set range, namely, the specific gravities do not fulfill the relationship $SG_L \leq SG_F \leq SG_S$, the operation of one feed chamber is stopped in the same manner as above, and the specific gravity of the affected float is adjusted.

By virtue of the arrangement and method of the present invention as described above, the specific gravity of the float can be adjusted according to variations in the specific gravity of the driving liquid or the slurry without stopping the overall operational process even where the specific gravities of the driving liquid and slurry are difficult to detect due to a high viscosity or a high temperature.

Although one embodiment of the present invention has been explained with regard to the provision of three feed cambers, as can readily be appreciated, it is also possible to provide four or more feed chambers. In such a situation, the operation of two of the feed chambers maybe stopped to adjust the specific gravity of the respective floats.

According to the present invention, the specific gravity of at least one of the driving liquid and slurry or the rise and fall times of the floats are detected and, when the detected specific gravity or the detected times exceed allowable values or limits, the specific gravity of the float is adjusted. Therefore, the specific gravity of the float can be easily adjusted according to variations in the specific gravity of the driving liquid or the slurry without stopping the operation of the entire process.

What is claimed is:

1. A vertical hydro-hoist comprising:
a plurality of feed chamber means for temporarily reserving a slurry,
supply and discharge pipe means for a driving liquid for feeding said slurry under pressure, said supply and discharge pipe means being connected to an upper portion of each of said feed chamber means,
slurry feed and discharge pipe means connected to a lower portion of each of said feed chamber means,
detector means provided at upper and lower portions on an outside of each of said feed chamber means for detecting a position of a float means floating at an interface between said slurry and said driving liquid in each of said feed chamber means,
valve means provided in said driving liquid supply and discharge pipe means and said slurry feed and discharge pipe means, said valve means being adapted to be opened and closed in accordance with data supplied by said detector means to thereby feed said slurry under pressure,
a specific gravity detector means for detecting specific gravity of at least one of said driving liquid and said slurry,
means for adjusting the specific gravity of said float means, said specific gravity adjusting means including holder means for temporarily gripping said float means and means for supplying and discharging a specific gravity adjusting liquid into and out of said float means, and controller means for said specific gravity adjusting means for adjusting the specific gravity of said float means in accordance with a deviation between a set specific gravity of said float means and a specific gravity detected by said specific gravity detector means.

2. A hydro-hoist comprising:

a plurality of feed chamber means for temporarily reserving a slurry, supply and discharge pipe means for feeding a driving liquid to the respective feed chamber means, slurry feed and discharge pipe means for feeding said slurry to the respective feed chamber means, means for detecting a position of a float means floating at an interface between said slurry and said driving liquid in each of said feed chamber means, valve means provided in said driving liquid supply and discharge pipe means and said slurry feed and discharge pipe means, means for detecting a specific gravity of at least one of said driving liquid and said slurry, means for adjusting a specific gravity of said float means, said specific gravity adjusting means having means for temporarily gripping said float means and means for supplying and discharging a specific gravity adjusting liquid into and out of said float means, and means for controlling said specific gravity adjusting means so as to adjust the specific gravity of said float means in accordance with the specific gravity detected by said gravity detecting means.

3. A hydro-hoist comprising:

a plurality of feed chamber means for reserving a slurry, supply and discharge pipe means for feeding a driving liquid to the respective feed chamber means, slurry feed and discharge pipe means for feeding said slurry to the respective feed chamber means, float means provided in each of said feed chamber means, means for detecting a position of said float means, means for detecting a relationship of specific gravity between said driving liquid, said slurry, and said float means, means for adjusting the specific gravity of said float means, said specific gravity adjusting means having means for holding said float means and means for supplying and discharging a specific gravity adjusting liquid into and out of said float means, and means for controlling said specific gravity adjusting means according to relationship detected by said relationship detecting means.

4. A specific gravity adjusting apparatus for a float means in a hydro-hoist, the apparatus comprising:

means for temporarily holding said float means at a predetermined position in a chamber means of said hydro-hoist, and means for supplying and discharging a specific gravity adjusting liquid into and out of said float means.

5. An apparatus for adjusting a specific gravity of a float means for a hydro-hoist, the apparatus comprising:

means for temporarily holding said float means,
means for supplying and discharging a specific gravity adjusting liquid into and out of said float means, means for detecting a relationship of specific gravity between a driving liquid, a slurry and said float means in said hydro-hoist, and means for controlling said specific gravity adjusting liquid supplying and discharging means in accordance with said relationship detected by said relationship detecting means.

6. A specific gravity adjusting apparatus for a float means in a hydro-hoist, the apparatus comprising:

a plurality of holder means for temporarily gripping said float means in a chamber means of said hydro-hoist, a liquid feed/discharge disk means for inserting a specific gravity adjusting liquid into said float means, said disk means being provided on said float means, feed/discharge pipe means for feeding and discharging the specific gravity adjusting liquid into and out of said float means through said disk means, said feed/discharge pipe means being insertable into said float means by driving means, and pump means for supplying and discharging the specific gravity adjusting liquid into and out of said float means through said feed/discharge pipe means.

7. A vertical hydro-hoist comprising:

a plurality of feed chamber means for temporarily reserving a slurry, supply and discharge pipe means for a driving liquid for feeding said slurry under pressure, said supply and discharge pipe means being connected to an upper portion of each of said feed chamber means, slurry feed and discharge pipe means connected to a lower portion of each of said feed chamber means, float position detector means provided at upper and lower portions on an outside of the respective feed chamber means for detecting a position of a float means floating at an interface between said slurry and said driving liquid in each of said feed chamber means, valve means provided in said driving liquid supply and discharge pipe means and said slurry feed and discharge pipe means, said valve means being opened and closed in accordance with data from said float position detector means to thereby feed said slurry under pressure, means for detecting rise time and fall time of said float means between both said float position detector means provided at upper and lower portions, means for adjusting the specific gravity of said float means, said specific gravity adjusting means including a holder means for temporarily gripping said float means and means for supplying and discharging a specific gravity adjusting liquid into and out of said float means, and controller means for said specific gravity adjusting means for adjusting the specific gravity of said float means in accordance with a difference between said rise time and said fall time detected by said rise time detecting means.

8. A vertical hydro-hoist according to claim 7, wherein said means for detecting said rise time and fall time of said float means comprises timer means connected to said float position detector means.

9. An apparatus for adjusting a specific gravity of a float means of a hydro-hoist, the apparatus comprising:

means for temporarily holding said float means, means for supplying and discharging a specific gravity adjusting liquid into and out of said float means, means for detecting a rise time and fall time of said float means over a predetermined distance, means for controlling said specific gravity adjusting liquid supplying and discharging means in accordance with a difference between said rise time and said fall time detected by said rise time and fall time detecting means.

10. A hydro-hoist comprising:

a plurality of feed chamber means for reserving a slurry, supply and discharge pipe means for feeding a driving liquid to the respective feed chamber means, slurry feed and discharge pipe means for feeding said slurry to the respective feed chamber means, a float means provided in the respective feed chamber means, means for detecting a position of said float means, means for detecting a rise time and fall time of said float means over a predetermined distance, means for adjusting the specific gravity of said float means, said specific gravity adjusting means having means for holding said float means and means for supplying and discharging a specific gravity adjusting liquid into and out of said float means, and means for controlling said specific gravity adjusting means in accordance with a difference between said rise time and said fall time detected by said rise time and fall time detecting means.

11. A method of operating a vertical hydro-hoist, the method comprising the steps of:

providing a plurality of feed chamber means for temporarily reserving a slurry, providing supply and discharge pipe means for a driving liquid for feeding said slurry under pressure, said supply and discharge pipe means being connected to the respective feed chamber means, providing slurry feed and discharge pipe means connected to the respective feed chamber means, detecting a position of a float means floating at an interface between said slurry and said driving liquid in each of said feed chamber means, opening and closing valve means provided in said driving liquid supply and discharge pipe means and said slurry feed and discharge pipe means in accordance with a position of said float means, detecting a specific gravity of at least one said driving liquid and said slurry, stopping an operation of at least one of said feed chamber means when said detected specific gravity shows a deviation from an allowable set specific gravity, holding said float means in the feed chamber means stopping an operation thereof, and adjusting the specific gravity of said float means by supplying or discharging a specific gravity adjusting liquid into or out of said float means in accordance with the deviation from the allowable set specific gravity.

12. A method of operating a hydro-hoist having a plurality of feed chamber means for reserving a slurry, supply and discharge pipe means for feeding a driving liquid to said feed chamber means, slurry feed and discharge pipe means for feeding slurry to the respective feed chamber means, the method comprising the steps of:

detecting a specific gravity of at least one of said driving liquid and said slurry, stopping an operation of at least one of said feed chamber means when said detected specific gravity shows a deviation from an allowable set specific gravity, holding said float means at a predetermined position in said feed chamber means to stop the operation thereof, adjusting the specific gravity of said float means by supplying or discharging a specific gravity adjusting liquid into or out of said float means in accordance with the deviation from the allowable set specific gravity, and establishing the following relationship:

$SG_L \leqq SG_F \leqq SG_S$, where:

$SG_L$ = the specific gravity of the driving liquid,
$SG_F$ = the specific gravity of the float, and
$SG_S$ = the specific gravity of the slurry.

13. A method of operating a hydro-hoist having a plurality of feed chamber means for reserving a slurry, supply and discharge means for feeding a driving liquid to the respective feed chamber means, slurry feed and discharge pipe means for feeding slurry to the respective feed chamber means, and a float means provided in the respective feed chamber means, the method comprising the steps of:

detecting a relationship of specific gravities between said driving liquid, said slurry and said float means, stopping an operation of at least one said feed chamber means, holding said float means at a predetermined position in the stopped feed chamber means, adjusting the specific gravity of said float means by supplying or discharging a specific gravity adjusting liquid into or out of said float means in accordance with said detected relationship of the specific gravities, and establishing the following relationship:

$SG_L \leqq SG_F \leqq SG_S$, where:

$SF_L$ = the specific gravity of the driving liquid,
$SG_F$ = the specific gravity of the float, and
$SG_S$ = the specific gravity of the slurry.

14. A method of operating a hydro-hoist having a plurality of feed chamber means for reserving a slurry, supply and discharge pipe means for feeding a driving liquid to the respective feed chamber means, slurry feed and discharge pipe means for feeding slurry to the respective feed chamber means, and a float means provided in the respective chamber means, the method comprising the steps of:

detecting rise time and fall times of said float means over a predetermined distance, stopping an operation of at least one of said feed chamber means, holding said float means at a predetermined position in the stopped feed chamber means, adjusting the specific gravity of said float means by supplying or discharging a specific gravity adjusting liquid into or out of said float means in accordance with the detected difference between the rise time and the fall time, and establishing the following relationship:

$SG_L \leqq SG_F \leqq SG_S$, where:

$SF_L$ = the specific gravity of the driving liquid,
$SG_F$ = the specific gravity of the float, and
$SG_S$ = the specific gravity of the slurry.

* * * * *